US008511616B2

(12) United States Patent
Adamo

(10) Patent No.: US 8,511,616 B2
(45) Date of Patent: Aug. 20, 2013

(54) SOLAR POWERED EXCESS ELECTRON EMISSION DEVICE

(75) Inventor: Richard C. Adamo, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 1175 days.

(21) Appl. No.: 12/417,251

(22) Filed: Apr. 2, 2009

(65) Prior Publication Data
US 2009/0250555 A1 Oct. 8, 2009

Related U.S. Application Data

(60) Provisional application No. 61/042,033, filed on Apr. 3, 2008.

(51) Int. Cl.
*B64G 1/44* (2006.01)
(52) U.S. Cl.
USPC .................................. 244/172.7; 244/171.7
(58) Field of Classification Search
USPC .......... 244/172.7, 171.5, 171.7, 158.1, 158.6; 136/244, 291, 292; 315/169.3; 361/218, 361/212, 216
See application file for complete search history.

(56) References Cited

U.S. PATENT DOCUMENTS

| | | | |
|---|---|---|---|
| 3,614,529 A | 10/1971 | Naneviez et al. | |
| 5,160,374 A | 11/1992 | Frederickson et al. | |
| 6,177,629 B1 * | 1/2001 | Katz | 136/244 |
| 6,362,574 B1 * | 3/2002 | Aguero et al. | 315/169.3 |
| 6,459,206 B1 | 10/2002 | Aguero et al. | |
| 6,463,672 B1 | 10/2002 | Lai et al. | |
| 6,518,693 B1 * | 2/2003 | Meyer et al. | 313/359.1 |
| 6,545,853 B1 * | 4/2003 | Gelderloos et al. | 361/218 |
| 6,577,130 B1 | 6/2003 | Adamo et al. | |
| 6,844,714 B2 | 1/2005 | Balmain et al. | |
| 2001/0009353 A1 | 7/2001 | Patterson et al. | |
| 2003/0111104 A1 * | 6/2003 | Akamatsu | 136/246 |

FOREIGN PATENT DOCUMENTS

EP 0 637 900 A1 2/1995
WO 00/77862 A1 12/2000

OTHER PUBLICATIONS

PCT International Search Report for PCT/US2009/039288, dated May 26, 2009 (2 pages).
European Patent Office "Supplementary European Search Report", European Application No. 09728886.4, Mail date of Sep. 1, 2011, Munich, 7 pages.

(Continued)

*Primary Examiner* — Rob Swiatek
*Assistant Examiner* — Valentina Xavier
(74) *Attorney, Agent, or Firm* — Guerin & Rodriguez, LLP; Michael A. Rodriguez

(57) ABSTRACT

The chassis of a spacecraft has one side exposed to ultraviolet photons and another side shielded from the ultraviolet photons. An electrically conductive surface is disposed on the exposed side of the chassis and is electrically isolated from the chassis. A field-emission array device has a gate, an emitter array, a first terminal electrically connected to the gate, and a second terminal electrically connected to the emitter array. The first terminal electrically couples the gate to the electrically conductive surface on the exposed side of the chassis, and the second terminal electrically couples the emitter array to a surface on the shielded side of the chassis. The emitter array discharges electrons from the surface on the shielded side when a voltage difference in excess of a threshold voltage develops between the gate and the emitter array because of differential charging of the exposed and shielded sides of the chassis.

17 Claims, 8 Drawing Sheets

(56) References Cited

OTHER PUBLICATIONS

Pedersen, A. et al., "Methods for Keeping a Conductive Spacecraft Near the Plasma Potential", Proceedings of the ESLAB Symposium on Spacecraft/Plasma Interactions and Their Influence on Field and Particle Measurements, Sep. 1, 1983, pp. 185-190.

PCT International Preliminary Report on Patentability for PCT/US2009/039288, dated Oct. 5, 2010 (6 pages).

* cited by examiner

SOLAR POWERED EXCESS ELECTRON EMISSION DEVICE

RELATED APPLICATION

This application claims the benefit of U.S. Provisional Application Ser. No. 61/042,033, filed Apr. 3, 2008, titled "Spacecraft Charging Powered Excess Electron Emission Device," the entirety of which provisional application is incorporated by reference herein.

FIELD OF THE INVENTION

The invention relates generally to spacecraft technology. More specifically, the invention relates to an apparatus and method of detecting and mitigating spacecraft charging.

BACKGROUND

Spacecraft of all types are subject to various undesirable interactions with their ambient space plasma environment. Many geosynchronous and polar orbiting satellites, for example, experience operational anomalies caused by spacecraft charging. Many satellite failures are attributable to the failure of their solar arrays, and at least half of the solar array failures are believed to be charging induced. In general, two sources of spacecraft charging dominate as causes for generating large differences in potential on spacecraft surfaces: (1) high-energy sub-storm electron currents, and (2) photo-emission currents. During geomagnetic sub-storms, all surfaces of a synchronous orbit spacecraft collect excess high-energy electrons (>>10 keV) and consequently charge negatively. However, the sunlit surfaces of the spacecraft continuously emit photoelectrons and consequently approach plasma potential. The opposing charging phenomena can cause a large potential difference to develop between the sunlit and dark surfaces. This potential difference can lead to catastrophic electrostatic discharging.

FIG. 1 illustrates the process with a satellite 10, having two wings of solar arrays (or panels) extending from opposite sides of the satellite's body. One side 2 of each solar array faces the sun, while another side 4 lies in shadow. On the sunny side, plasma ions 6 and plasma electrons 8 impinge upon sunlit surfaces. Some incident electrons reflect off the sheathing or cover glass of the solar array, other electrons backscatter after reaching the solar array surface, while solar photons 14 induce photoelectrons 12 to leave the array surfaces. The positive charging of the array surface repels some plasma ions 6, while some photoelectrons 12 return to the surface, attracted by the positive surface charge. Photoemission typically produces a current density in excess of one nA/cm$^2$. Meanwhile, on the shadowed side 4, plasma ions 6 and plasma electrons 8 impinge upon dark surfaces, with the developing negative charge of the surface repelling some plasma electrons.

The unequal charging of different surfaces of the spacecraft results in inverted electric-field gradients, as illustrated in FIG. 2. The structure (or chassis) 16 of the spacecraft 10 charges negatively, while the sunlit front surfaces of the solar arrays 18 charge positively. The potential difference that develops between the surfaces of the arrays and the chassis can range from hundreds to thousands of volts, and can increase over time. The graph 20 of FIG. 3 shows an increasing potential difference between a sunlit surface and the spacecraft chassis. In the graph, the y-axis represents potential in volts, and the x-axis represents time. Plot 22 represents the charging over time, for example, of a sunlit cover of a solar cell, whereas plot 24 represents the charging over time of the spacecraft chassis. The separation between the plots at any given time indicates the difference in potential between the surfaces. For example, at time 0, the voltages are equal, but after 500 seconds of charging, a voltage difference approximating 1000 volts develops because of the charging phenomena described above, with the solar cell surface charging less negatively than the chassis.

The threat posed by inverted gradients is that electrostatic discharge (ESD) can occur at lower potentials than normal gradient charging (on the scale of hundreds of volts, instead of thousands). FIG. 4A, FIG. 4B, and FIG. 4C show a destructive process that can result from the inverted electric-field gradients that form between a sunlit surface and the spacecraft chassis. In FIG. 4A, a solar cell cover 30 shields the underlying interconnections 32 of the solar array. The solar cell array sits on a conductive chassis or frame 34 (i.e., ground). The interconnections 32 are generally small conductive traces or wires that string together the solar cells of an array. The cover 30 is typically made of a dielectric material, effectively insulated from ground. Differential charging between adjacent surfaces (e.g., between solar array strings) can induce a primary arc of ESD. This primary arc generates a plasma cloud 36.

In FIG. 4B, the plasma cloud 36 provides a conduction path 38 between solar array strings 30 at different potentials. An actively powered solar array string provides the power to sustain high-energy secondary arcing or discharges. These secondary arcs may result in catastrophic permanent array damage by opening or short-circuiting adjacent solar array strings or power conditioning components. FIG. 4C shows, for example, a carbon track 40 amidst the interconnections 32 that shorts neighboring array strings. This problem pervades the satellite industry.

SUMMARY

In one aspect, the invention features a system for emitting electrons collected by a chassis of a spacecraft located in an environment in which one side of the chassis is impinged upon by ultraviolet (UV) photons and another side of the chassis is shielded from the UV photons. The system includes an electrically conductive surface disposed on the side of the chassis impinged upon by UV photons. The electrically conductive surface is electrically isolated from the chassis of the spacecraft. A micro-fabricated field-emission array device has a gate, an array of emitters, a first terminal electrically connected to the gate, and a second terminal electrically connected to the array of emitters. The first terminal electrically couples the gate to the electrically conductive surface on the side of the chassis being impinged upon by the UV photons, and the second terminal electrically couples the array of emitters to a surface on the side of the chassis shielded from the UV photons. The array of emitters discharges electrons from the surface on the shielded side of the chassis when a voltage difference in excess of a threshold voltage develops between the gate and the array of emitters because of differential charging of the electrically conductive surface on the side of the chassis being impinged upon by the UV photons and the surface on the shielded side of the chassis.

In another aspect, the invention features a method of emitting electrons collected by a chassis of a spacecraft located in an environment in which one side of the chassis is impinged upon by ultraviolet (UV) photons and another side of the chassis is shielded from the UV photons. The method includes electrically coupling a gate of a micro-fabricated field-emission array device to an electrically conductive surface disposed on the side of the chassis being impinged upon by the UV photons. The electrically conductive surface is electrically isolated from the chassis. An array of emitters of the field-emission array device is electrically coupled to a surface on a side of the chassis that is shielded from the UV photons. Electrons are emitted from the surface on the shielded side of the chassis by the array of emitters of the field-emission array device when a voltage difference in excess of a threshold voltage develops between the gate and the array of emitters because of differential charging of the electrically conductive surface on the side of the chassis being impinged upon by the UV photons and the surface on the side of the chassis that is shielded from the UV photons.

In still another aspect, the invention features a spacecraft comprising a chassis having one side exposed to ultraviolet (UV) photons from a photon source and another side shielded from the UV photons, A dielectric insulator is disposed on the side of the chassis exposed to the UV photons. An electrically conductive surface is disposed on the dielectric insulator on the exposed side of the chassis. The dielectric insulator electrically isolates the electrically conductive surface from the chassis. An electron emission unit has one or more microfabricated field-emission array devices. Each field-emission array device has a gate, an array of emitters, a first terminal electrically connected to the gate of that field-emission array device, and a second terminal electrically connected to the array of emitters of that field-emission array device. The first terminal of each field-emission array device electrically couples the gate of that field-emission array device to the electrically conductive surface on the exposed side of the chassis and the second terminal of each field-emission array device electrically couples the array of emitters of that field-emission array device to a surface on the shielded side of the chassis. The array of emitters of each field-emission array device discharges electrons from the shielded surface of the chassis when a voltage difference in excess of a threshold voltage develops between the gate and the array of emitters of that field-emission device because of differential charging of the electrically conductive surface on the exposed side of the chassis and the surface on the shielded side of the chassis.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Static-discharge systems described herein provide a simple, reliable means for continuously emitting electrons collected by the chassis of a spacecraft. This electron emission operates to reduce significantly the potential difference between a spacecraft chassis and less negatively charged sunlit surfaces of the spacecraft. The lower potential reduces the magnitudes of inverted electric-field gradients that can form on solar arrays. The limited magnitudes prevent the occurrence of primary arcs, which are the trigger source for secondary arcs and the cause of ESD-related solar array failures. Such systems can have many practical uses on most synchronous and polar orbiting spacecraft.

Figure 1:
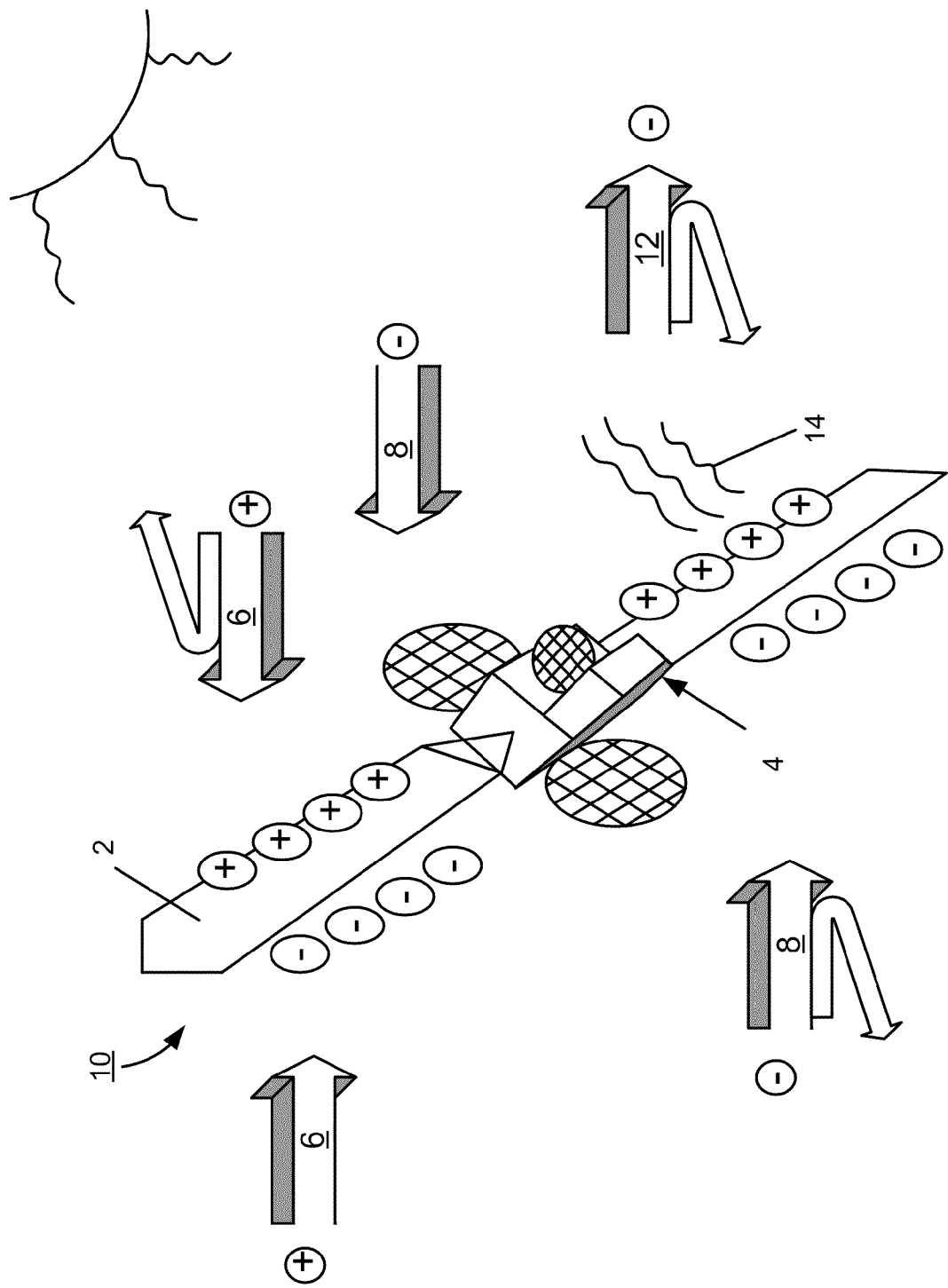
FIG. 1 is a diagram illustrating differential charging of surfaces of a spacecraft.
Figure 2:
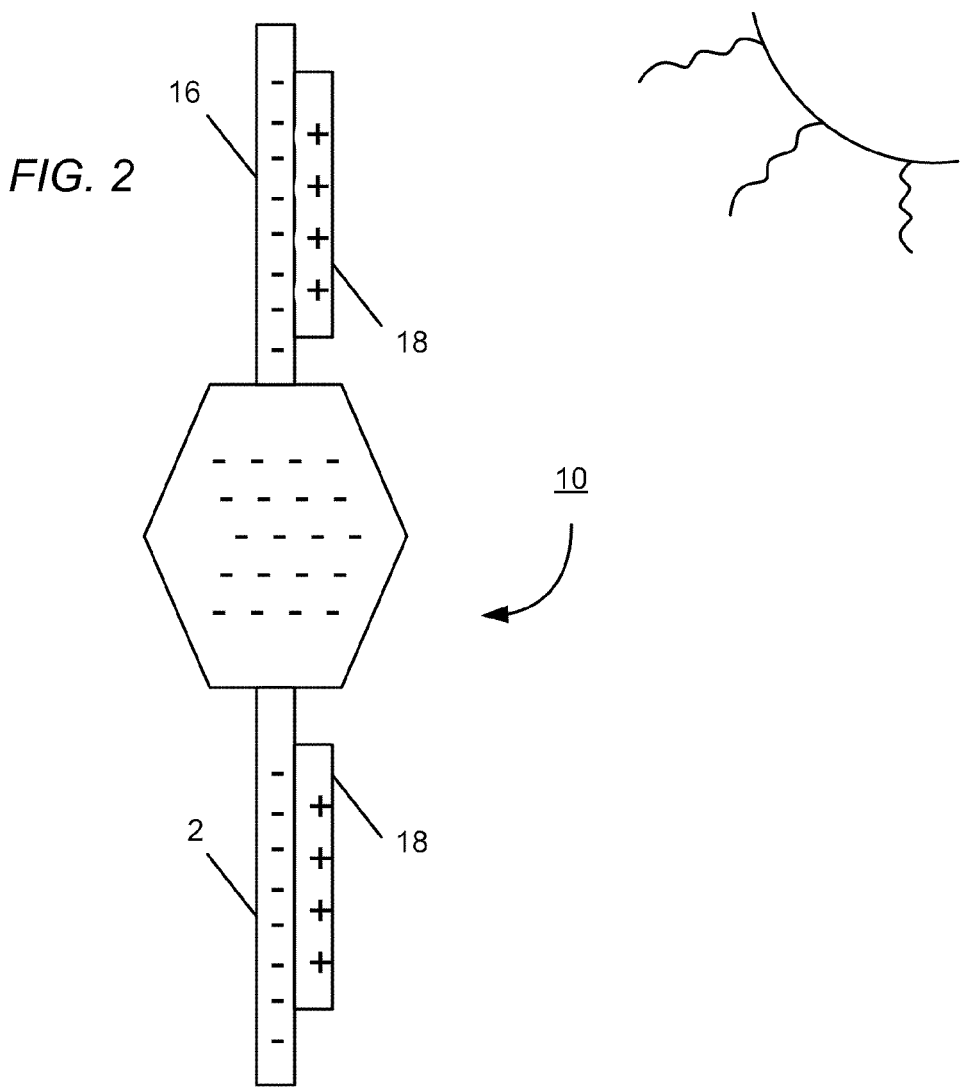
FIG. 2 is a diagram illustrating inverted gradient charging of surfaces of the spacecraft.
Figure 3:
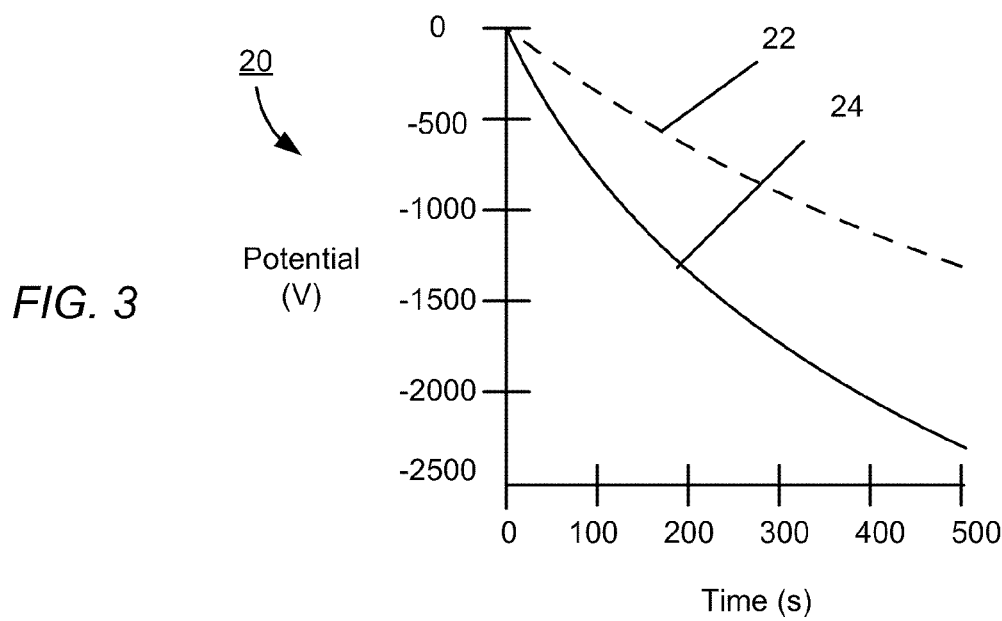
FIG. 3 is a graph over time illustrating the increasing difference in potential between a sunlit surface and a spacecraft chassis.
Figure 4A:
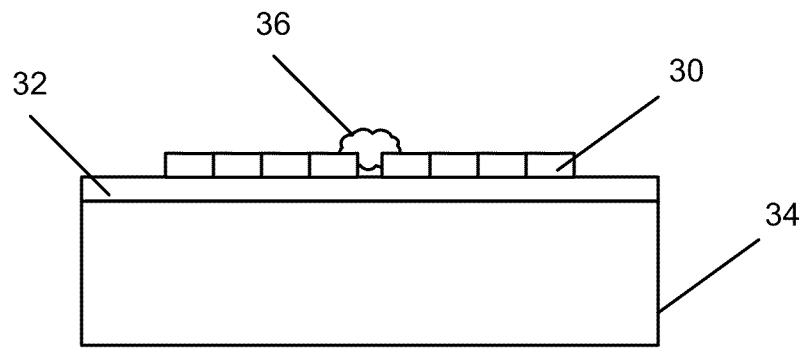
FIG. 4A, FIG. 4B, and FIG. 4C are diagrams illustrating a destructive process that can be caused by the increase in potential difference between a sunlit surface and the spacecraft chassis.
Figure 4B:
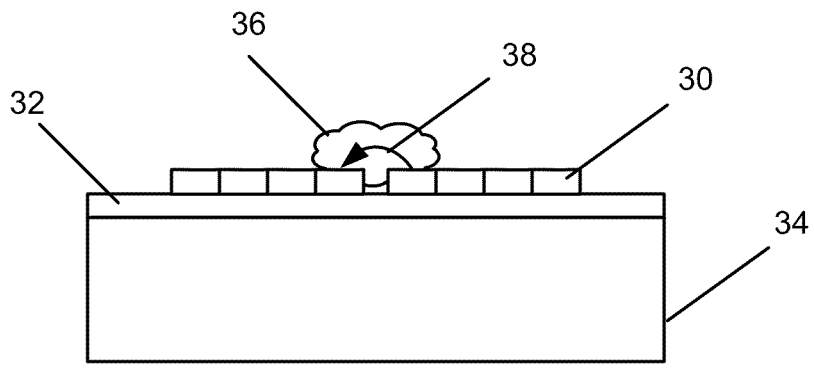
Figure 4C:
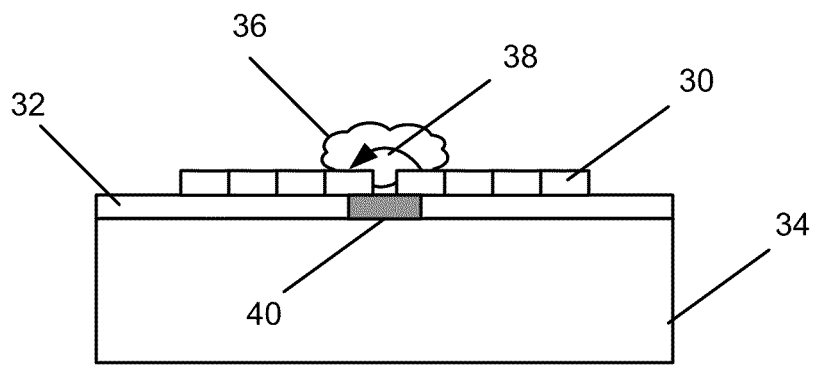
Figure 5:
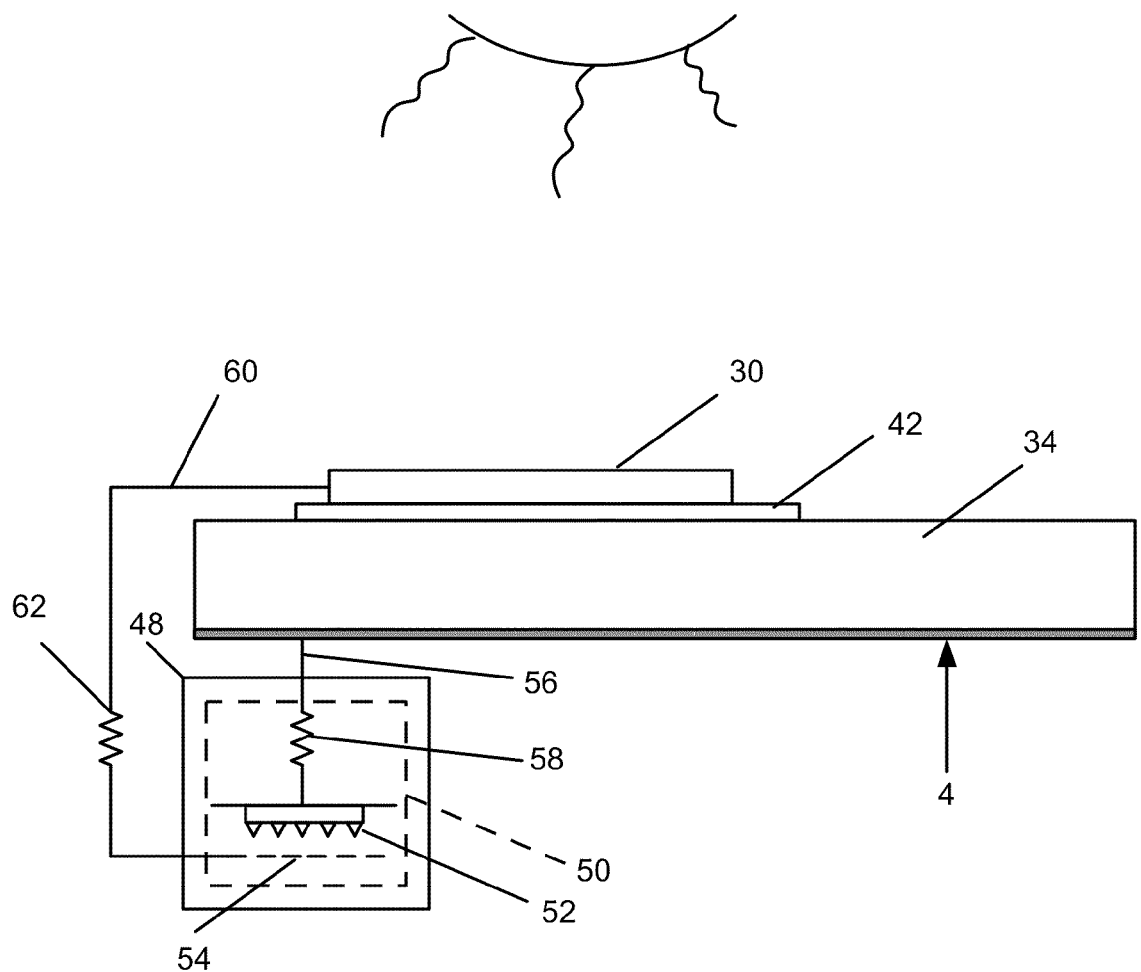
FIG. 5 is a diagram illustrating a static discharge system for discharging static buildup on the sunlit surface automatically and continuously.

FIG. 5 shows an embodiment of a static-discharge system for limiting the potential difference that can be attained between a spacecraft chassis 34 and sunlit surfaces. An electrically conductive patch 30 is disposed on a dielectric insulator 42 (e.g., the cover glass protecting the solar cells) located on the sunlit side of the solar array. The dielectric insulator 42 resides on the spacecraft chassis 34 and electrically isolates the sunlit conductive patch 30 from "ground" potential (i.e., the potential of the chassis). The charging experienced by this sunlit conductive patch 30 is representative of the charging experienced by the various other sunlit surfaces of the spacecraft. The size of the conductive patch 30 can be chosen based on the size of the spacecraft and the anticipated worst-case charging conditions. In one embodiment, the conductive patch is 100 cm2.

Electrically connected to the dark side 4 of the electrically conductive chassis 34 is an electron emission unit 48. The electron emission unit 48 includes a micro-fabricated, gated field-emission array (FEA) device 50. Although only one FEA device 50 is shown, the electron emission unit 48 can have two or more FEA devices, for example, to provide redundancy or to increase the total amount of current emission. In addition, each solar wing can have its own electron emission unit 48, or both wings can share a single electron emission unit 48.

The FEA device 50 includes a gate electrode 54 in close proximity to the tips of an array of emitters 52. In one embodiment, the FEA device 50 is a Spindt cathode FEA. Examples of Spindt cathode FEAs and their uses are described in U.S. Pat. No. 6,362,574, issued Mar. 26, 2002, and in U.S. Pat. No. 7,053,558, issued May 30, 2006, the entireties of which U.S. patents are incorporated by reference herein. Current micro-fabrication techniques are able to form on resistive substrates miniaturized field emitters with tip radii of the order of 100 Angstroms or less, and an integrated field-forming gate electrode less than 1 μm away from the emitter tips. In addition, micro-fabrication technology enables the fabrication of millions of emitter tips simultaneously over large areas, ranging from a few microns to 13 cm in diameter, and with packing densities approaching 2.5×107 tips/cm2. Emitter arrays approximately 1 mm in diameter commonly produce total emission currents of 100 mA, and small arrays of tips have achieved emission current densities of 1000 A/cm2. Because of the small scale of geometries of the gate electrode and emitters, micro-fabricated FEA devices require relatively low power to emit charge efficiently. Typical device operating voltages are approximately 100 V or less, and reliable operation is possible over a temperature range of approximately 70° K to 900° K. For many applications, Spindt cathode FEA devices are mounted on standard TO-5 headers.

An emitter electrode 56 connects the array of emitters 52 to the dark side 4 of the spacecraft chassis 34 through a current-limiting resistor 58 (e.g., the resistive substrate). An electrically conductive path 60 connects the sunlit conductive patch 30 to the gate electrode 54 through a current-limiting resistor 62. Although shown on the dark side 4 of the satellite, the electron emission unit 48 can be physically located anywhere on the satellite 10, provided the emitter electrode is electrically connected to the dark side of the chassis and the gate electrode is electrically connected to a conductive sunlit patch.

Figure 6:
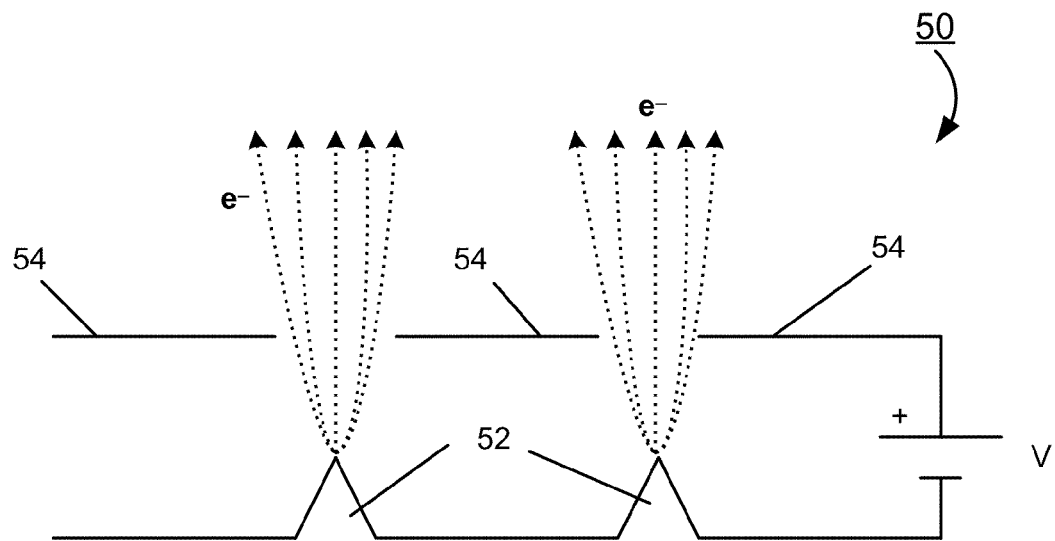
FIG. 6 is a diagram illustrating fundamental physics of a field-emission array used in the static discharge system.

FIG. 6 shows the typical operational characteristics of an embodiment of an FEA device 50. In general, a positive voltage (V) applied across the gate electrode 54 and the emitters 52 controls the quantity of electrons (e−) emitted by the FEA device 50. Once this voltage exceeds a threshold, the FEA device 50 begins to emit electrons. A further increase in voltage induces a corresponding increase in electron emission. When the voltage falls below the threshold, the emitters 52 cease to emit.

Referring back to FIG. 5, with the FEA device 50 connected to the spacecraft as shown, when the natural spacecraft charging process produces a positive voltage difference between the gate electrode 54 and the emitters 52 in excess of the emission threshold, the emitters 52 turn on and begin to emit electrons from the spacecraft chassis 34. The emitters continue to emit and the spacecraft chassis 34 becomes less negatively charged until the voltage difference drops below the emission threshold (i.e., typically less than 100 V). When clamping the voltage difference to the threshold voltage, the array emission current equals the total chassis collection current, which is not expected to exceed a few 100 μA for large spacecraft under worst-case charging conditions. The FEA device 50 thus imposes a maximum limit on the potential difference that can develop between the sunlit conductive patch 30 and the chassis 34, which operates to limit the magnitude of any inverted electric field gradient that may form between sunlit and dark surfaces. The magnitude of this maximum potential difference is such that the occurrence of primary arcs becomes unlikely. This clamping process is self-powered (i.e., being driven by unequal charging of dark and sunlit surfaces) and self-limiting (i.e., by the electron emission voltage threshold of the FEA device). Unlike other existing related systems, the FEA device 50 of the electron emission unit 48 does not require an external controller or power supply for ongoing operation.

Figure 7:
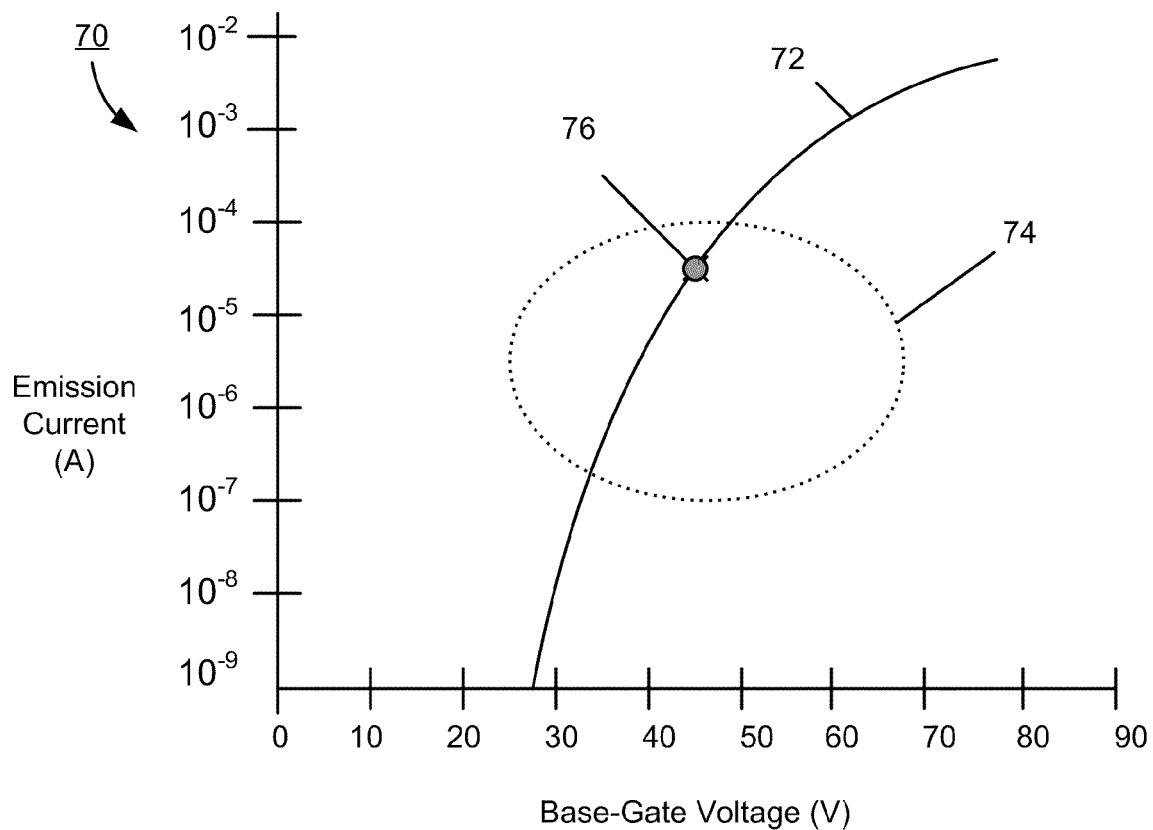
FIG. 7 is a graph illustrating the operating characteristics of an embodiment of the field-emission array.

FIG. 7 shows a graph 70 of the operating characteristics of one embodiment of the FEA device 50 that can be used to discharge electrons from the spacecraft chassis. The logarithmic y-axis corresponds to emission current in amps, and the linear x-axis corresponds to the voltage difference between the gate electrode 54 and the emitters 52. Plot 72 shows the electron emission increasing with increasing voltage. The expected operating range of the FEA device 50 when discharging electrons from the spacecraft chassis falls within the circle 74. Within this operating range, at approximately 44 volts (x-axis), the FEA device 50 can produce an emission current of approximately 30 μA. If the chassis of the spacecraft accumulates electrons at a current density of approximately 1 nA/cm2, a single FEA device 50 is capable of discharging current collected in a 1000 ft2 area of the spacecraft.

Electrical Isolation

Figure 8:
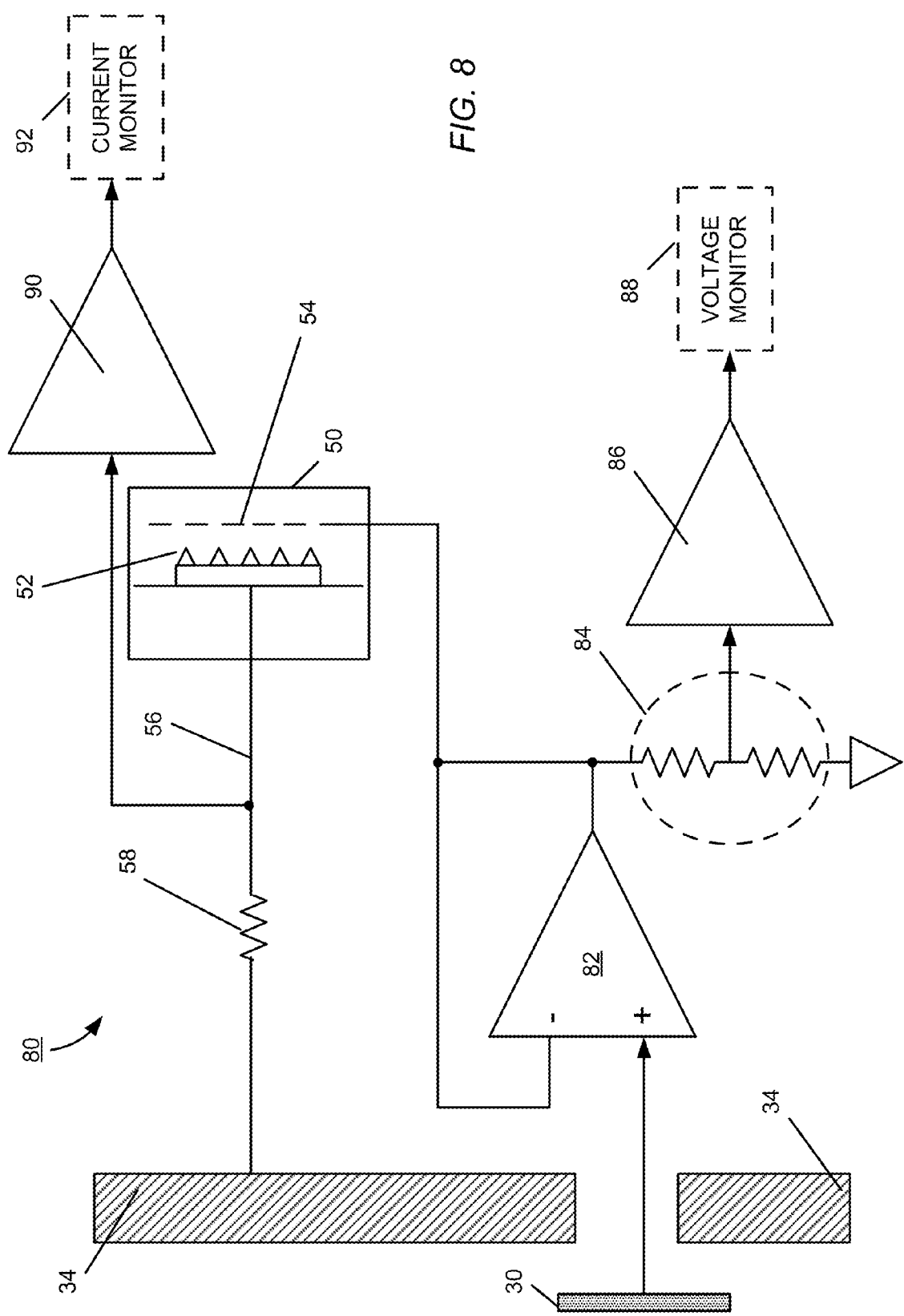
FIG. 8 is a diagram of circuitry for operably coupling the field-emission array to the spacecraft.

If sufficient electrical isolation cannot be maintained between the FEA gate electrode 54 and the FEA emitter electrodes 52 (because of inadvertent electrical leakage across a connector holding the FEA device) the differences in the naturally occurring charging currents on the sunlit and dark sides may not be sufficient to develop the required operating voltage across the FEA device 50 to produce the desired electron emission. FIG. 8 shows circuitry 80 for assuring electrical isolation between the gate electrode 54 and emitter electrodes 52 of the FEA device 50. The circuitry 80 includes a high-voltage voltage follower circuit 82 having a positive input terminal electrically connected to the sunlit conductive patch 30 of the solar array. The output terminal of the voltage follower circuit 82 feeds back to a negative input terminal. The output terminal is also electrically connected to the gate electrode 54 of the FEA device 50 and to a voltage divider 84. The voltage produced by the voltage divider 84 passes to a voltage monitor 88 through a buffer 86.

In one embodiment, the high-voltage voltage follower circuit includes an operational amplifier with high input impedance, effectively isolating the output from the input and placing no loading effects on the input. The voltage follower circuit 82 produces an output voltage equal to its input voltage (at the positive input terminal). This output voltage changes equally to changes in the input voltage.

The emitter electrode 56 electrically connects the array of emitters 52 of the FEA device 50 to the spacecraft chassis 34 through the resistor 58 (which may be a characteristic inherent to the substrate of the FEA device). A current monitor 92 can be electrically connected to the emitter electrode 56 through a buffer 90, to measure the current emitted by the FEA device 50.

The voltage and current monitors 88, 92 track the performance of the FEA device 50. The measured voltages and currents over time can be correlated to changing "space weather" conditions of the spacecraft's environment; that is, the monitors 88, 92 can devise the occurrence of a sub-storm by detecting the development of an inverted electric-field gradient and observing the effect of subsequently turning on the FEA device 50.

Cathode Protection

Figure 9:
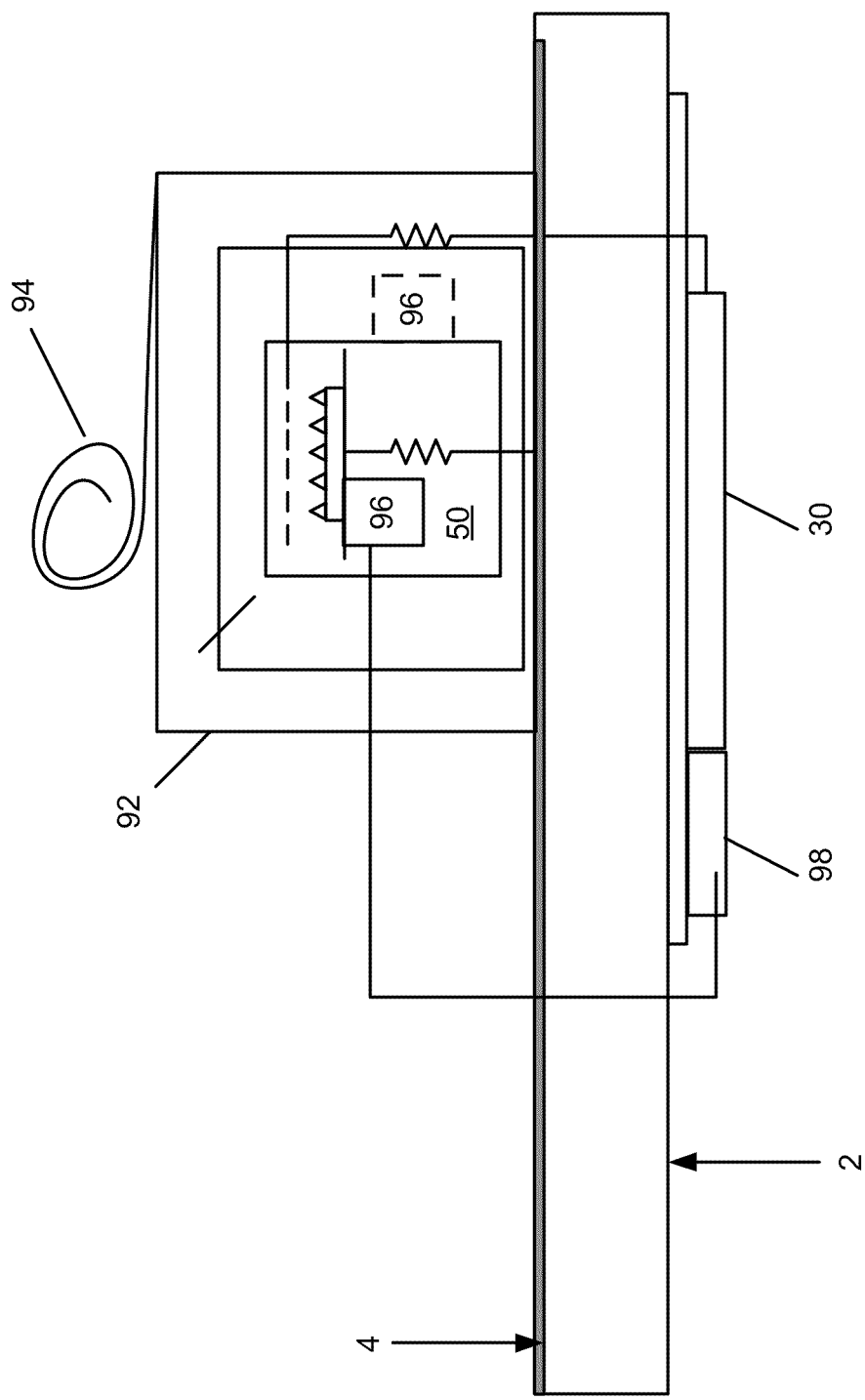
FIG. 9 is a diagram illustrating an embodiment of a static discharge system having a protective enclosure and a heater for preconditioning the field-emission array.

In space applications, each FEA device 50 typically needs protection from contamination and damage until deployment and throughout its operational life. FIG. 9 shows the electron emission unit 48, which includes one or more FEA devices 50, residing within a protective enclosure 92. One side or lid 94 of the protective enclosure opens once, upon deployment, to provide an aperture for electron emission. That lid may roll back upon itself like the lid of a sardine can opened with a key. Alternatively, the lid 94 can be made of a foil that becomes torn open upon deployment. Various other mechanical mechanisms are known in the art for opening the enclosure. In addition, an external incident charged-particle protection grid (not shown), biased to prevent ion bombardment, can cover the emission aperture.

Heating

Because the FEA device 50 typically operates only when spacecraft charging causes the gate-to-emitter voltage to rise beyond a given threshold, the array of emitters may be essentially inactive for significant periods (i.e., for days or weeks) until that threshold is attained. During these periods, contaminants from nearby surfaces could be deposited on an exposed emitter array and prevent proper or expected operation when emission is ultimately required. Heating a potentially contaminated emitter array (typically to several hundred degrees centigrade for a predefined period) before device operation sufficiently cleans the emitter surfaces to enable proper operation. In addition, because actual moments of spacecraft charging are somewhat unpredictable, a small ultra high vacuum (UHV) heating element 96 is incorporated near to or within the FEA device 50 to maintain the emitter array at an elevated temperature continuously, thus mitigating or eliminating the possible deleterious effects of contaminant deposition.

In one embodiment, the heating element 96 can be implemented with a small UHV heater, part number 343-heater-2x10, produced by Allectra, Ltd. of Newhaven, United Kingdom. In another embodiment, the heating element 96 (shown as a box with dashed lines) is a nichrome wire wrapped externally around the package of the FEA device 50. A few volts bias for the protection grid and the heating element 96 can be acquired from a few dedicated, low-power solar cells 98 mounted adjacent the sunlit conductive patch 30.

Simulation Environment

Figure 10:
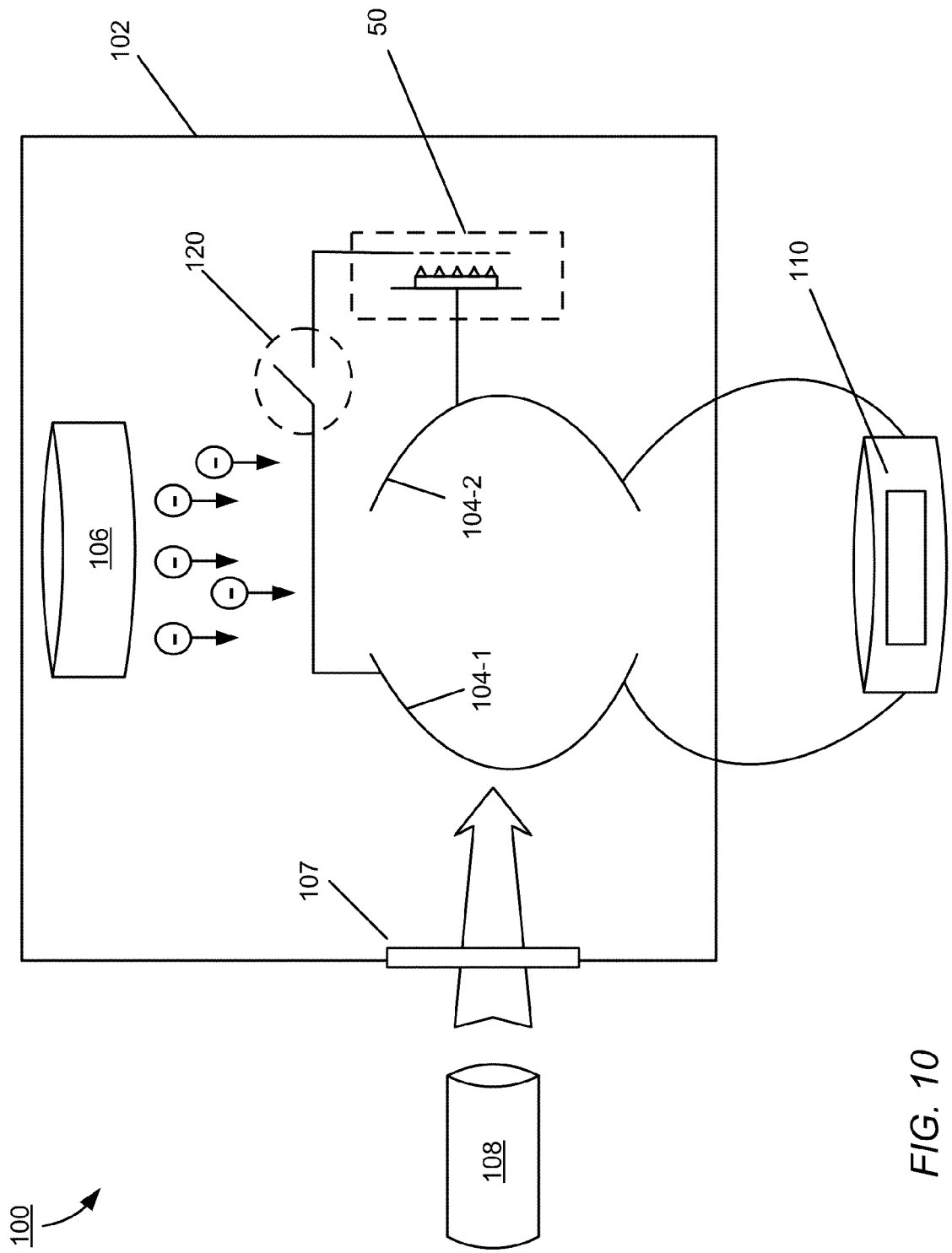
FIG. 10 is a diagram of an example of a test environment used to demonstrate the principles of operation of the static discharge system.

Because of the potential cost, inconvenience, and delay associated with testing a static discharge system after it is deployed in space, a test environment 100 shown in FIG. 10 can be used to demonstrate its effectiveness. The test environment 100 includes a vacuum chamber 102 within which are two electrically isolated copper plates 104-1, 104-2, which simulate the sunlit and dark surfaces, respectively, of a spacecraft. A 20 keV electron source 106 simultaneously exposes both copper plates to a high-energy electron beam. A UV photon source 108, simulating the sun, shines light through a quartz window 107 in a chamber wall at the copper plate 104-1 representing a sunlit surface.

A FEA device 50 is electrically connected to the copper plates 104-1, 104-2, with the gate electrode 54 connected to the illuminated copper plate 104-1 through a switch 120 and the array of emitters 52 connected to the other copper plate 104-2. A voltmeter 110 measures the voltage difference between the copper plates 104-1, 104-2. When the FEA device 50 is disconnected from the copper plates (i.e., the switch 120 is open) a potential difference of several thousand volts develops because of the electron and photon sources. With the switch closed, the FEA device 50 in this particular test environment reduces the voltage to less than 50 volts.

While the invention has been shown and described with reference to specific preferred embodiments, it should be understood by those skilled in the art that various changes in form and detail may be made therein without departing from the spirit and scope of the invention as defined by the following claims.

What is claimed is:

1. A system for emitting electrons collected by a chassis of a spacecraft located in an environment in which one side of the chassis is impinged upon by ultraviolet (UV) photons and another side of the chassis is shielded from the UV photons, the system comprising:
    an electrically conductive surface disposed on the side of the chassis impinged upon by UV photons, the electrically conductive surface being electrically isolated from the chassis of the spacecraft; and
    a micro-fabricated field-emission array device having a gate, an array of emitters, a first terminal electrically connected to the gate, and a second terminal electrically connected to the array of emitters, the first terminal electrically coupling the gate to the electrically conductive surface on the side of the chassis being impinged upon by the UV photons, and the second terminal electrically coupling the array of emitters to a surface on the side of the chassis shielded from the UV photons, the array of emitters discharging electrons from the surface on the shielded side of the chassis when a voltage difference in excess of a threshold voltage develops between the gate and the array of emitters because of differential charging of the electrically conductive surface on the side of the chassis being impinged upon by the UV photons and the surface on the shielded side of the chassis.

2. The system of claim 1, further comprising a heater element operatively coupled to the field-emission array device to heat the array of emitters.

3. The system of claim 1, further comprising circuitry electrically coupled in an electrical path between the electrically conductive surface on the side of the chassis being impinged upon by the UV photons and the gate of the field-emission array device, the circuitry including a voltage follower circuit for electrically isolating the gate of the field-emission array device from the emitter array of the field-emission array device.

4. The system of claim 3, further comprising solar cells, disposed on the side of the chassis being impinged upon by the UV photons, for supplying power to the circuitry.

5. The system of claim 1, further comprising a self-opening protective vacuum enclosure housing the field-emission array device until the spacecraft is deployed in the environment.

6. A method of emitting electrons collected by a chassis of a spacecraft located in an environment in which one side of the chassis is impinged upon by ultraviolet (UV) photons and another side of the chassis is shielded from the UV photons, the method comprising:
    electrically coupling a gate of a micro-fabricated field-emission array device to an electrically conductive surface disposed on the side of the chassis being impinged upon by the UV photons, the electrically conductive surface being electrically isolated from the chassis;
    electrically coupling an array of emitters of the field-emission array device to a surface on a side of the chassis that is shielded from the UV photons; and
    emitting electrons from the surface on the shielded side of the chassis by the array of emitters of the field-emission array device when a voltage difference in excess of a threshold voltage develops between the gate and the array of emitters because of differential charging of the electrically conductive surface on the side of the chassis being impinged upon by the UV photons and the surface on the side of the chassis that is shielded from the UV photons.

7. The method of claim 6, further comprising electrically coupling circuitry in an electrical path between the electrically isolated electrically conductive surface on the side of the spacecraft that is being impinged upon by the UV photons and the gate of the field-emission array device, the circuitry including a voltage follower circuit for electrically isolating the gate of the field-emission array device from the emitter array of the field-emission array device.

8. The method of claim 7, further comprising providing power to the circuitry from solar cells on the side of the chassis being impinged upon by UV photons.

9. The method of claim 6, further comprising heating the emitter array of the field-emission array device while the spacecraft is deployed in the environment.

10. The method of claim 6, further comprising enclosing the field-emission array device in a self-opening protective vacuum enclosure until the spacecraft is deployed in the environment.

11. A spacecraft comprising:
a chassis having one side exposed to ultraviolet (UV) photons from a photon source and another side shielded from the UV photons;
a dielectric insulator disposed on the side of the chassis exposed to the UV photons;
an electrically conductive surface disposed on the dielectric insulator on the exposed side of the chassis, the dielectric insulator electrically isolating the electrically conductive surface from the chassis; and
an electron emission unit having one or more micro-fabricated field-emission array devices, each field-emission array device having a gate, an array of emitters, a first terminal electrically connected to the gate of that field-emission array device, and a second terminal electrically connected to the array of emitters of that field-emission array device, the first terminal of each field-emission array device electrically coupling the gate of that field-emission array device to the electrically conductive surface on the exposed side of the chassis and the second terminal of each field-emission array device electrically coupling the array of emitters of that field-emission array device to a surface on the shielded side of the chassis, the array of emitters of each field-emission array device discharging electrons from the shielded surface of the chassis when a voltage difference in excess of a threshold voltage develops between the gate and the array of emitters of that field-emission device because of differential charging of the electrically conductive surface on the exposed side of the chassis and the surface on the shielded side of the chassis.

12. The spacecraft of claim 11, wherein the electron emission unit further comprises a heater element operatively coupled to each field-emission array device to heat the emitter array of that field-emission array device.

13. The spacecraft of claim 11, wherein the electron emission unit further comprises circuitry electrically coupled in an electrical path between the electrically conductive surface on the exposed side of the chassis and the gate of each field-emission array device, the circuitry including voltage follower circuitry for electrically isolating the gate of each field-emission array device from the emitter array of that field-emission array device.

14. The spacecraft of claim 13, further comprising solar cells disposed on the exposed side the chassis for supplying power to the circuitry.

15. The spacecraft of claim 13, further comprising a voltage monitor operatively coupled to an output of the voltage follower circuitry to measure voltage produced by a charging of the electrically conductive surface on the exposed side of the chassis.

16. The spacecraft of claim 11, further comprising a self-opening protective enclosure housing the electron emission unit until the spacecraft is deployed into the environment.

17. The spacecraft of claim 11, further comprising a current monitor electrically coupled to the emitter array of each field-emission array device to measure current emitted by that field-emission array device.

* * * * *